US012742351B2

(12) United States Patent
Rajavenkatanarayanan et al.

(10) Patent No.: US 12,742,351 B2
(45) Date of Patent: Sep. 22, 2026

(54) INTELLIGENT WINDOW AND DOORS

(71) Applicant: GM Global Technology Operations LLC, Detroit, MI (US)

(72) Inventors: Akilesh Rajavenkatanarayanan, Macomb, MI (US); Mohammad Naserian, Windsor (CA); Manoj Kumar Sharma, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 18/666,284

(22) Filed: May 16, 2024

(65) Prior Publication Data

US 2025/0354430 A1 Nov. 20, 2025

(51) Int. Cl.

| | |
|---|---|
| ***E05F 15/73*** | (2015.01) |
| ***E05F 15/668*** | (2015.01) |
| ***E05F 15/689*** | (2015.01) |
| ***E05F 15/79*** | (2015.01) |

(52) U.S. Cl.

CPC ............ *E05F 15/73* (2015.01); *E05F 15/668* (2015.01); *E05F 15/689* (2015.01); *E05F 15/79* (2015.01); *E05F 2015/767* (2015.01); *E05Y 2400/40* (2013.01); *E05Y 2400/82* (2013.01); *E05Y 2400/8515* (2024.05); *E05Y 2900/531* (2013.01); *E05Y 2900/542* (2013.01); *E05Y 2900/546* (2013.01); *E05Y 2900/55* (2013.01)

(58) Field of Classification Search

CPC ....... E05F 15/73; E05F 15/668; E05F 15/689; E05F 15/79; E05F 2015/767; E05Y 2400/40; E05Y 2400/82; E05Y 2400/8515; E05Y 2900/531; E05Y 2900/542; E05Y 2900/546; E05Y 2900/55

USPC ........................................................... 701/49

See application file for complete search history.

(56) References Cited

U.S. PATENT DOCUMENTS

| | | | | |
|---|---|---|---|---|
| 9,520,006 | B1 * | 12/2016 | Sankovsky | G07C 5/085 |
| 2005/0184862 | A1 * | 8/2005 | Nagata | B60R 25/2009 340/425.5 |
| 2017/0016266 | A1 | 1/2017 | Van Wiemeersch et al. | |
| 2017/0075355 | A1 * | 3/2017 | Micks | G01S 13/865 |
| 2022/0153227 | A1 | 5/2022 | Srivastava et al. | |

FOREIGN PATENT DOCUMENTS

| | | | |
|---|---|---|---|
| DE | 10342702 | A1 | 4/2005 |
| DE | 102019128695 | A1 | 4/2020 |

* cited by examiner

*Primary Examiner* — Muhammad Shafi
(74) *Attorney, Agent, or Firm* — Honigman LLP; Matthew H. Szalach

(57) ABSTRACT

A method includes determining that a closure device is in an opened position. The method includes determining, via processing of sensor data, that a user is not present and determining whether an object is present. Based on determination that the closure device is in the opened position, and based on determination that the user is not present, and based on determination that the object is not present, the method includes prompting the user to select a command to adjust the closure device from the opened position to the closed position. Based on the user selecting the command, the method includes operating the closure device to adjust the closure device from the opened position to the closed position.

19 Claims, 12 Drawing Sheets

INTELLIGENT WINDOW AND DOORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to methods and techniques for controlling operation of a closure system at a vehicle. More particularly, the methods and techniques described herein determine that a closure device of the vehicle (e.g., a door or window of the vehicle) is in an opened position and determine whether a user is away from the vehicle. Based on a determination of whether the user will return to the vehicle, an alert is generated to the user indicative of the opened closure device, a prompt is generated to the user requesting closure of the closure device, and/or the system controls operation of the closure device to move the closure device to the closed position.

Typically, when a user leaves a vehicle with one or more windows or doors open, the vehicle is not equipped to operate the windows or doors into closed positions. While some vehicles may have systems that automatically close windows and/or doors, these systems are traditionally controlled via a timer and, thus, move the windows and doors into closed positions after a threshold period of time has passed. This can result in the windows and doors closing even though the user intended to return to the vehicle, such as when unloading or loading the vehicle.

SUMMARY

One aspect of the disclosure provides a computer-implemented method that when executed on data processing hardware causes the data processing hardware to perform operations. The operations include determining that a closure device is in an opened position. The operations include determining, via processing of sensor data, that a user is not present. The operations include determining, via processing of sensor data, whether an object is present. Based on determination that the closure device is in the opened position, and based on determination that the user is not present, and based on determination that the object is not present, the operations include prompting the user to select a command to adjust the closure device from the opened position to a closed position. Based on the user selecting the command, the operations include operating the closure device to adjust the closure device from the opened position to the closed position.

Implementations of the disclosure may include one or more of the following optional features. In some implementations, based on determination that the closure device is in the opened position, and based on determination that the user is not present, and based on determination that the object is present, the operations further include generating an alert to the user. The alert is indicative of the closure device being in the opened position and presence of the object.

In some examples, the user selecting the command includes selection of a user preference setting.

In some aspects, based on determination that the closure device is in the opened position, and based on determination of an adverse condition, the operations further include operating the closure device to adjust the closure device from the opened position to the closed position and generating a notification to the user. The notification is indicative of adjusting the closure device from the opened position to the closed position.

In some implementations, prompting the user to select the command is further based on determination of a known location.

In some examples, based on determination that operating the closure device has failed to adjust the closure device from the opened position to the closed position, the operations further include generating an alert to the user. The alert is indicative of the closure device failing to adjust from the opened position to the closed position.

In some aspects, the closure device is disposed at a vehicle. In these aspects, while the vehicle is travelling along a road, and based on determination that the closure device is in the opened position, and based on receiving a signal from another vehicle indicative of an adverse condition, the operations further include prompting the user to select the command to adjust the closure device from the opened position to the closed position.

In some implementations, the closure device is disposed at a vehicle. In these implementations, while the vehicle is travelling along a road, and based on determination that the closure device is in the opened position, and based on determination that the object is present, the operations further include prompting the user to select the command to adjust the closure device from the opened position to the closed position.

In some examples, the closure device includes at least one selected from the group consisting of (i) a vehicular door, (ii) a vehicular liftgate, (iii) a vehicular window, and (iv) a vehicular sunroof.

Another aspect of the disclosure provides a system. The system includes memory hardware storing instructions that, when executed on data processing hardware in communication with the memory hardware, cause the data processing hardware to perform operations. The operations include determining that a closure device of a vehicle is in an opened position. The operations include determining, via processing of sensor data, that a user is not present at the vehicle. The operations include determining, via processing of sensor data, whether an object is present within the vehicle. Based on determination that the closure device is in the opened position, and based on determination that the user is not present, and based on determination that the object is not present, the operations include prompting the user to select a command to adjust the closure device from the opened position to a closed position. Based on the user selecting the command, the operations include operating the closure device to adjust the closure device from the opened position to the closed position. This aspect may include one or more of the following optional features.

In some implementations, based on determination that the closure device is in the opened position, and based on determination that the user is not present, and based on determination that the object is present, the operations further include generating an alert to the user. The alert is indicative of the closure device being in the opened position and presence of the object.

In some examples, the user selecting the command includes selection of a user preference setting.

In some aspects, prompting the user to select the command is further based on determination, via processing of sensor data, of at least one selected from the group consisting of (i) an outdoor location and (ii) a known location.

In some implementations, the closure device includes at least one selected from the group consisting of (i) a door of the vehicle, (ii) a liftgate of the vehicle, (iii) a window of the vehicle, and (iv) a sunroof of the vehicle.

Yet another aspect of the disclosure provides a vehicle. The vehicle includes memory hardware storing instructions that, when executed on data processing hardware in communication with the memory hardware, cause the data processing hardware to perform operations. The operations include determining that a closure device of the vehicle is in an opened position. The operations include determining, via processing of sensor data, that a user is not present at the vehicle. The operations include determining, via processing of sensor data, whether an object is present within the vehicle. Based on determination that the closure device is in the opened position, and based on determination that the user is not present, and based on determination that the object is not present, the operations include prompting the user to select a command to adjust the closure device from the opened position to a closed position. Based on the user selecting the command, the operations include operating the closure device to adjust the closure device from the opened position to the closed position. While the vehicle is travelling along a road, and based on determination that the closure device is in the opened position, and based on receiving a signal from another vehicle indicative of an adverse condition, the operations include prompting the user to select the command to adjust the closure device from the opened position to the closed position. This aspect may include one or more of the following optional features.

In some implementations, prompting the user to select the command is further based on determination, via processing of sensor data, of at least one selected from the group consisting of (i) an outdoor location and (ii) a known location.

In some examples, the user selecting the command includes selection of a user preference setting.

In some aspects, while the vehicle is travelling along the road, and based on determination that the closure device is in the opened position, and based on determination that the object is present, the operations further include prompting the user to select the command to adjust the closure device from the opened position to the closed position.

In some implementations, the closure device includes at least one selected from the group consisting of (i) a door of the vehicle, (ii) a liftgate of the vehicle, (iii) a window of the vehicle, and (iv) a sunroof of the vehicle.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
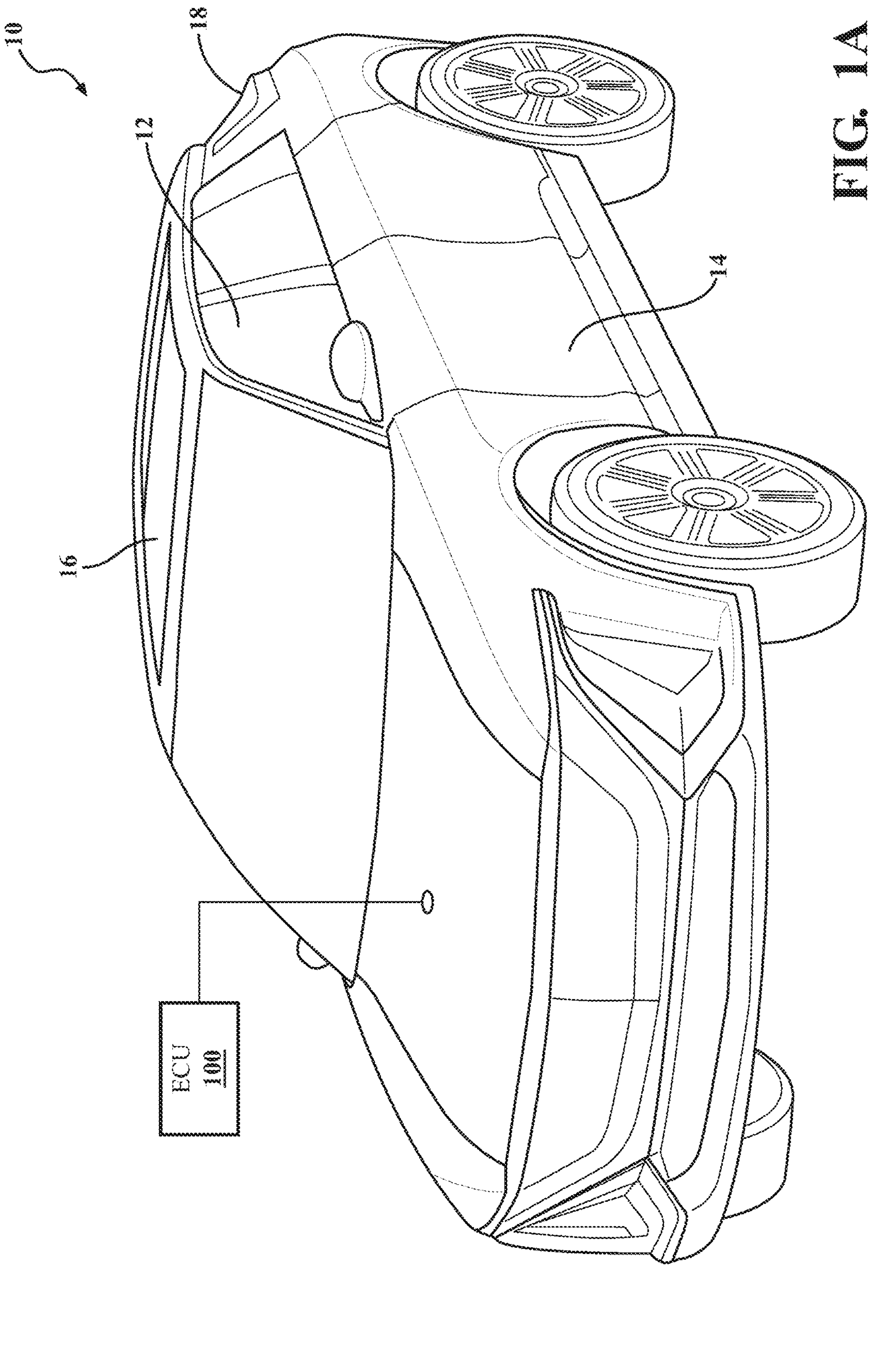
FIG. 1A is a perspective view of a vehicle equipped with a closure operating system.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1B:
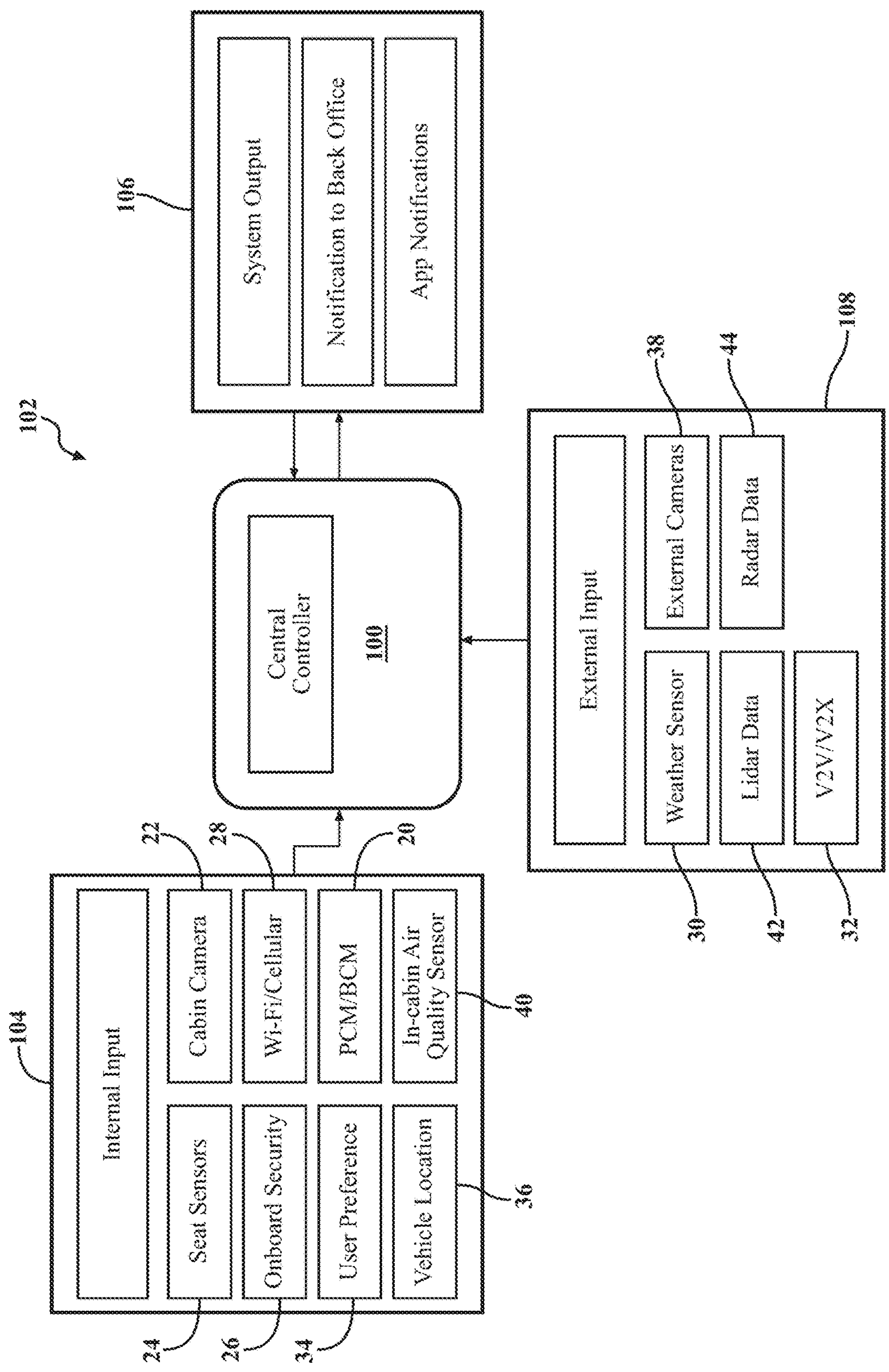
FIG. 1B is a schematic view of the closure operating system.

Referring now to the figures and the illustrated configurations depicted therein, a vehicle 10 is equipped with an electronic control unit (ECU) or controller 100 having electronic circuitry and associated software for controlling a closure operating system 102 of the vehicle 10 (FIGS. 1A and 1B). The closure operating system 102 is configured to operate one or more closure devices of the vehicle 10 between respective opened states, where the closure device is moved away from an opening to the vehicle 10 to allow access to the interior cabin or cargo area of the vehicle 10, and respective closed states, where the closure device extends over the opening of the vehicle 10 to close and preclude access to the interior cabin or cargo area of the vehicle 10. For example, the closure operating system 102 may operate one or more windows 12 of the vehicle 10, one or more doors 14 of the vehicle 10, a sunroof or moon roof or panoramic glass roof 16 of the vehicle, and a liftgate or tailgate 18 of the vehicle 10 between respective opened and closed positions. Thus, each of the closure devices of the vehicle 10 is motorized and connected to the closure operating system 102 so that movement of the closure device between the closed and opened positions can be controlled.

As discussed further below, when one or more closure devices are in the opened position and the vehicle 10 is stopped or parked, the closure operating system 102 determines whether the user is present at the vehicle 10. When the user is not present at the vehicle 10, the system 102 determines whether the user is likely to return to the vehicle 10, such as based on detection of objects within the vehicle 10 or proximity of the user to the vehicle 10. Based on determination that the user is not likely to return to the vehicle 10, the system 102 may generate an alert to the user, prompt the user to move the closure device to the closed position, and/or automatically move the closure device to the closed position.

The illustrated configurations of FIGS. 1A-4 will be discussed in relation to the method 500 of FIGS. 5A-5F and the method 600 of FIG. 6. FIGS. 5A-5F provide a flowchart of an exemplary arrangement of operations for a method 500 of operating the closure device between the opened and closed positions with the vehicle 10 in a parked or stopped position and based on determined presence of the user at the vehicle 10, determined presence of objects at the vehicle 10, and the like. At operation 502, upon commencement of a systems check of the vehicle 10 and with the vehicle 10 in a stopped or parked position, the method 500 includes determining whether one or more of the windows 12 or that one or more of the doors 14 of the vehicle 10 are in the opened position or the closed position. For example, the system 102 receives an input signal 104 from a body control module (BCM) 20 of the vehicle 10 for determining whether the windows 12 and doors 14 are in the opened or closed position.

Based on determination that the door 14 is in the closed position, operation 504 of the method 500 includes determining whether the door 14 is in a locked state or an unlocked state, which may be determined based on the input signal 104 received at the system 102 from the BCM 20 of the vehicle 10. Based on determination that the door 14 is in the locked state, the system check may be complete (FIG. 5B). When the system 102 determines that the door 14 is unlocked, the method 500 at operation 506 generates a signal or output 106 to the user indicative of the door 14 being unlocked.

Figure 2B:
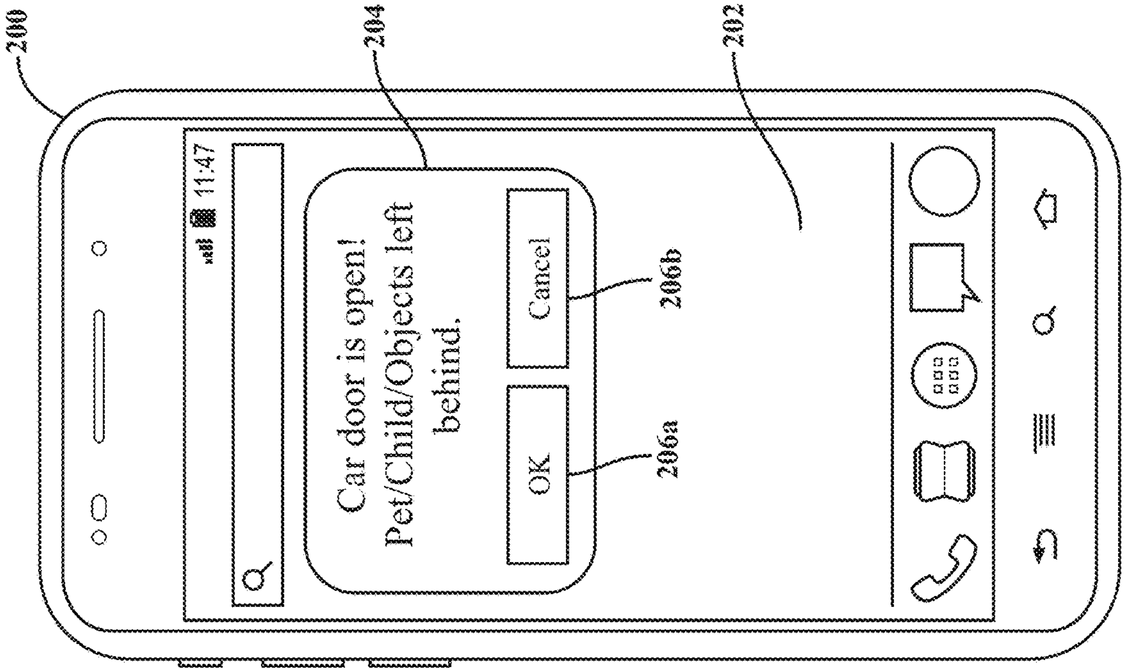
FIGS. 2A and 2B are schematic views of a user device displaying an alert to a user based on a signal received from the closure operating system.
Figure 2A:
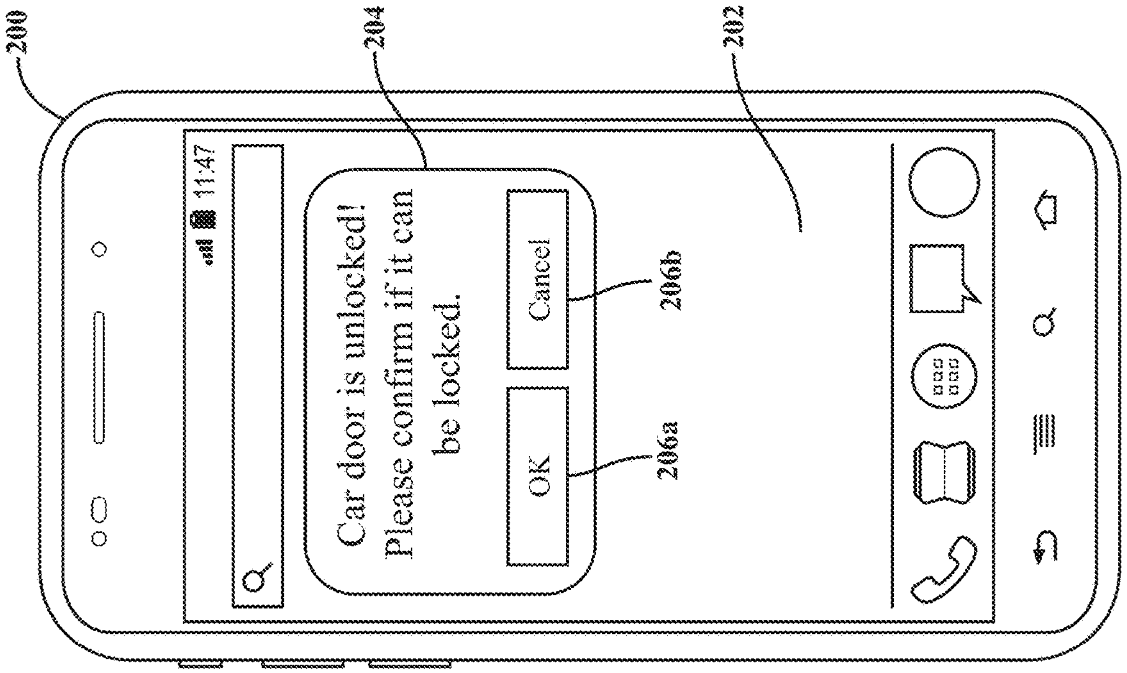

For example, and as shown in FIG. 2A, the system 102 may transmit the signal 106 to a user device 200 associated with the user, such as a mobile phone, laptop, wearable smart device, and the like, causing the user device 200 to display an alert or push notification 204 at a display screen 202 of the user device 200. The notification 204 may prompt the user to select a user selectable input 206*a*, 206*b* via the user device 200, such as a first input 206*a* that commands the system 102 to lock the door 14 and a second input 206*b* that ignores the notification and chooses not to lock the door 14.

At operation 507, the method 500 includes determining whether the user selected the first input 206*a* to command the system 102 to lock the door 14. Based on the user selecting the second input 206*b* and thus not commanding the system 102 to lock the door 14, the method 500 may return to operation 506 after a threshold period of time, such as two minutes or less, to notify the user that the door 14 is unlocked. Based on the user selecting the first input 206*a* and thus commanding the system 102 to lock the door 14, the system 102 may lock the door 14 at operation 508 of the method 500. After locking the door 14, the system 102 may generate a signal or output 106 to the user indicative of the door 14 being locked at operation 510 of the method 500.

Based on determination at operation 502 that the door 14 of the vehicle 10 is in the opened position, the system 102 at operation 512 determines whether the user is present at or near the vehicle 10. The system 102 may receive inputs 104 from one or more of a sensor 22 (e.g., an in-cabin camera or radar sensor) of a driver monitoring system (DMS) or occupant monitoring system (OMS) of the vehicle 10, a seat sensor 24 of the vehicle 10, an onboard security system 26 of the vehicle 10, and a Wi-Fi™ or cellular communication system 28 of the vehicle 10. For example, the system 102 may process image data captured by the in-cabin camera 22 to determine presence of the user and/or objects at or near the vehicle 10.

At operation 514, and based on determination that the user is not present at or near the vehicle 10 (e.g., within 10 meters or less of the vehicle), the method 500 includes determining whether an object is present at or near the vehicle 10. For example, the system 102 may be operable to determine presence of objects that indicate the user is likely to return to the vehicle 10, such as children, pets, grocery bags, luggage, and the like. Moreover, the system 102 may determine presence of objects that indicate the user is unlikely to return to the vehicle 10, such as based on a frequency that the object is left behind in the vehicle 10 (e.g., a tissue box, a tool box, and the like). Based on determination that an object is present in the vehicle 10 and thus that the user is likely to return to the vehicle 10, the method 500 at operation 516 includes generating an output signal 106 to the user to notify the user of the object being left behind with the door 14 opened.

As shown in FIG. 2B, the notification 204 presented at the user device 200 may be indicative of the system 102 determining presence of the object in the vehicle 10 and the door 14 being in the opened position. The first user selectable input 206*a* may allow the user to acknowledge the notification 204 such that the notification 204 is removed from the display 202 and further notifications 204 are not presented. The second user selectable input 206*b* may cause the notification 204 to be removed from the display 202, but also result in additional notifications 204, such as after a threshold period of time that the door 14 remains open and the object remains in the vehicle 10.

Figure 3B:
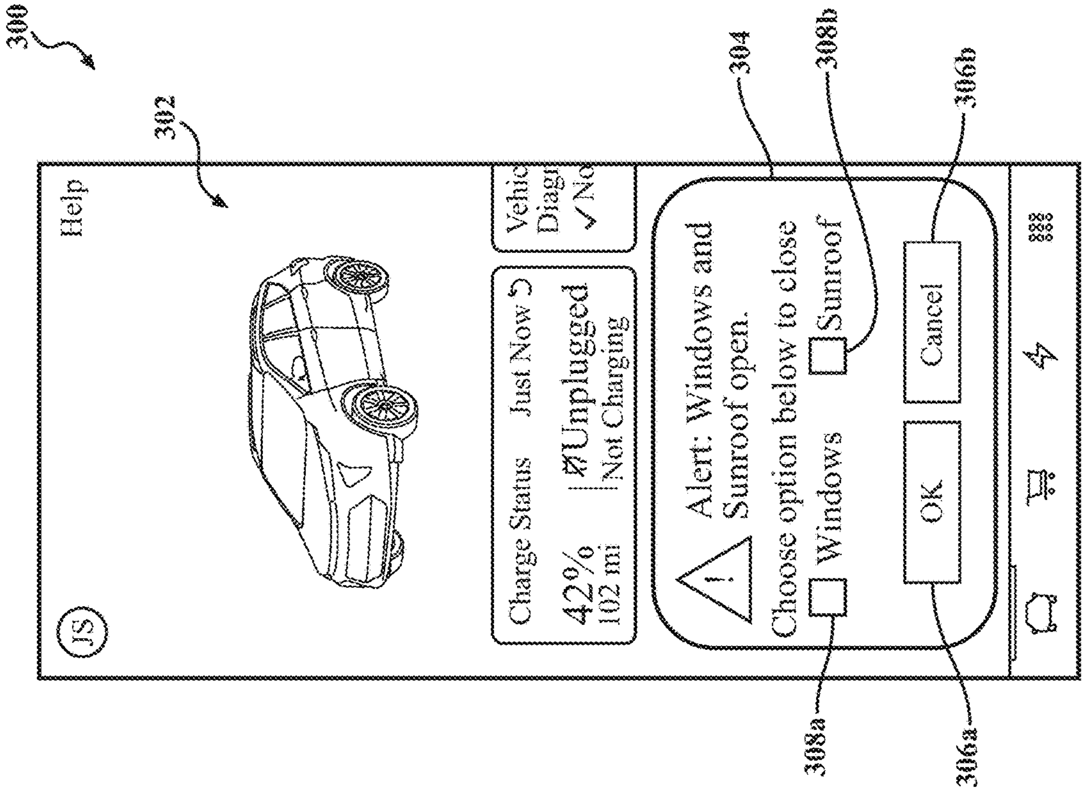
FIGS. 3A and 3B are schematic views of a graphical user interface displaying an alert to a user based on a signal received from the closure operating system.
Figure 3A:
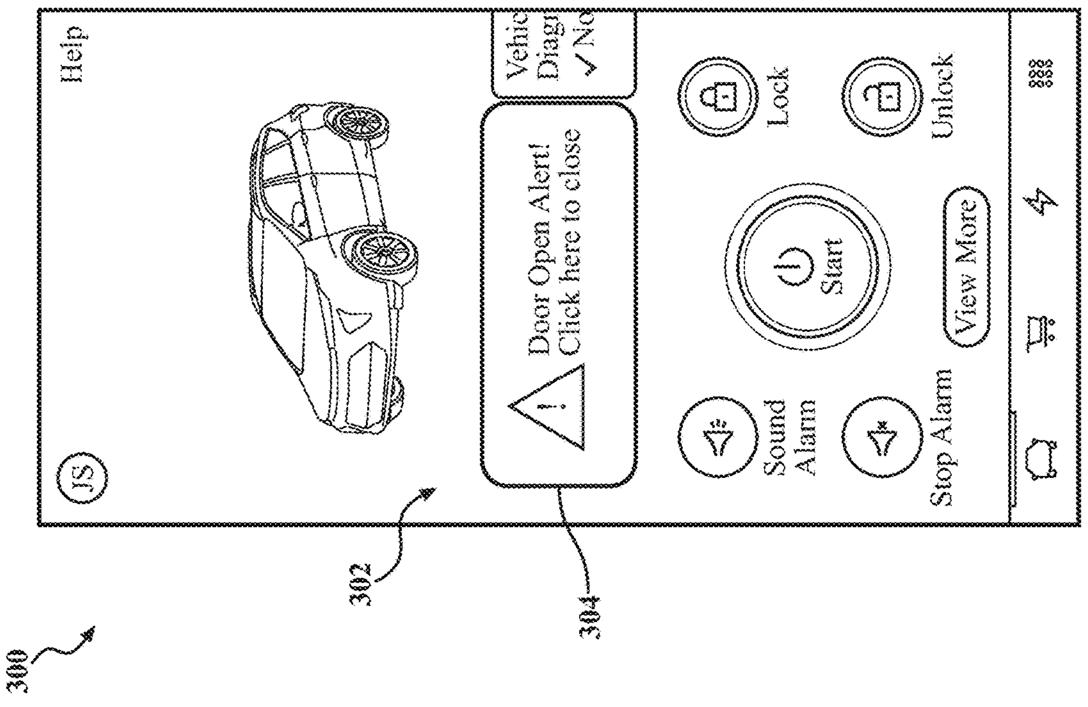

Based on determination that the door 14 is in the opened position and that no object is present in the vehicle 10 (or that no object is present in the vehicle 10 that is indicative of the user returning to the vehicle 10), the method 500 at operation 518 includes generating the output signal 106 to the user to notify the user of the door 14 being opened and prompt the user to close the door 14. For example, and as shown in FIG. 3A, the signal 106 may cause a graphical user interface 302 of an application 300 associated with the user, such as operated on the user device 200, to display an alert or selectable command 304 within the interface 302. Based on the user selecting the command 304 within the interface 302, the system 102 may control operation of the door 14 to move the door 14 to the closed position. In other words, the system 102 prompts the user to select the command 304 to adjust the door 14 to the closed position.

Thus, based on the user selecting the command 304 to adjust the door 14 to the closed position at operation 520 of the method 500, the method 500 at operation 522 operates the door 14 to adjust the door 14 from the opened position to the closed position. The method 500 may then return to operation 510 to notify the user that the door 14 is closed and/or locked.

After the system 102 notifies the user that the door 14 of the vehicle 10 is opened and prompts the user to command the door 14 to the closed position, and based on the user not commanding the door 14 to the closed position at operation 520 for at least a threshold period of time, such as two minutes or less, the method 500 returns to operation 518 until the user commands the door 14 to close. In some examples, the system 102 may automatically command the door 14 to close after a second threshold period of time (e.g., after ten minutes or longer) or after transmitting a threshold number of notifications to the user (e.g., after three notifications or more).

Figure 5A:
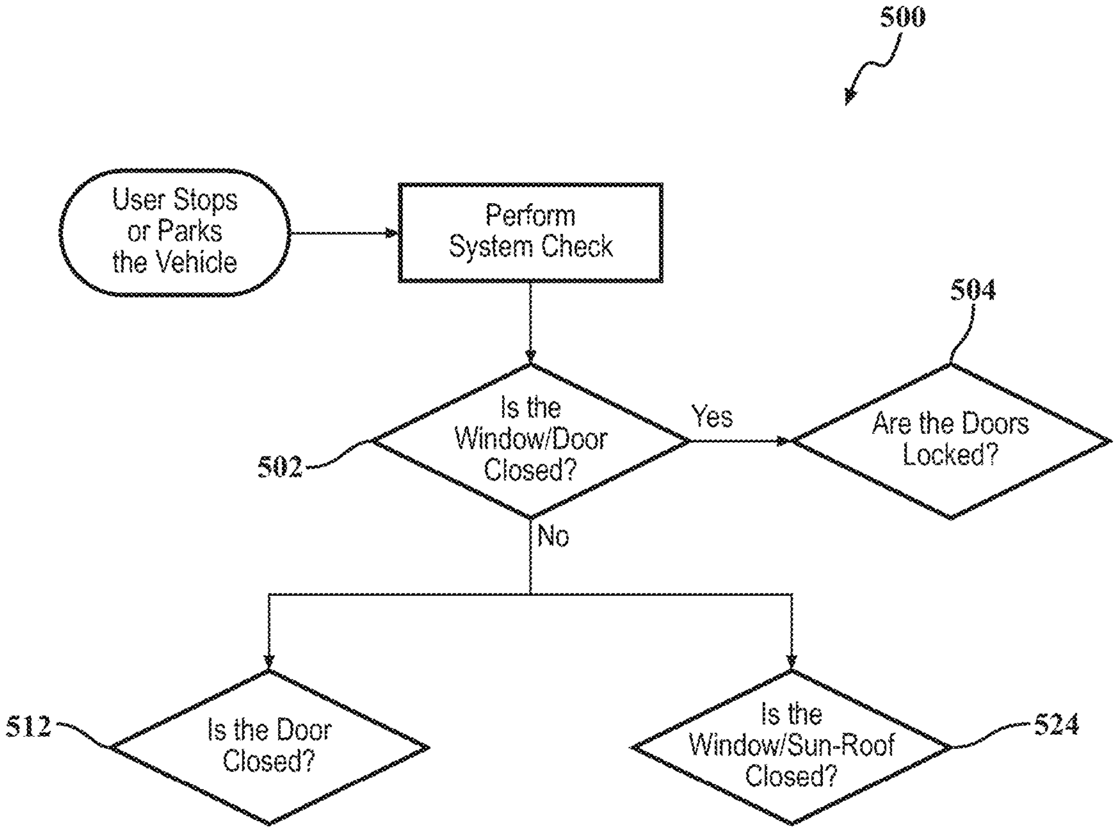
FIGS. 5A-5F are flow diagrams depicting an example method of operating the closure operating system with the vehicle in a parked or stopped position.
Figure 5B:
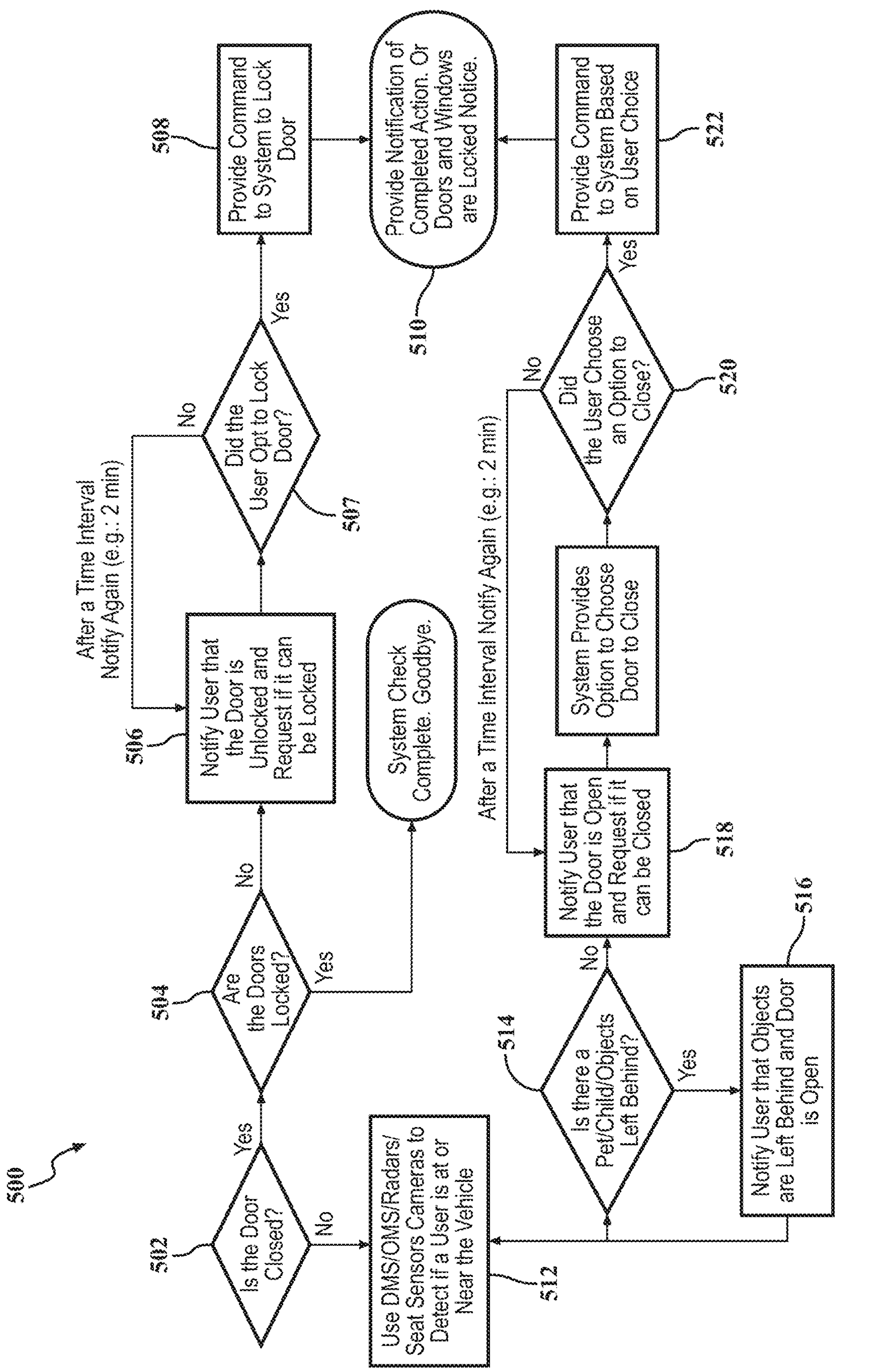
Figure 5C:
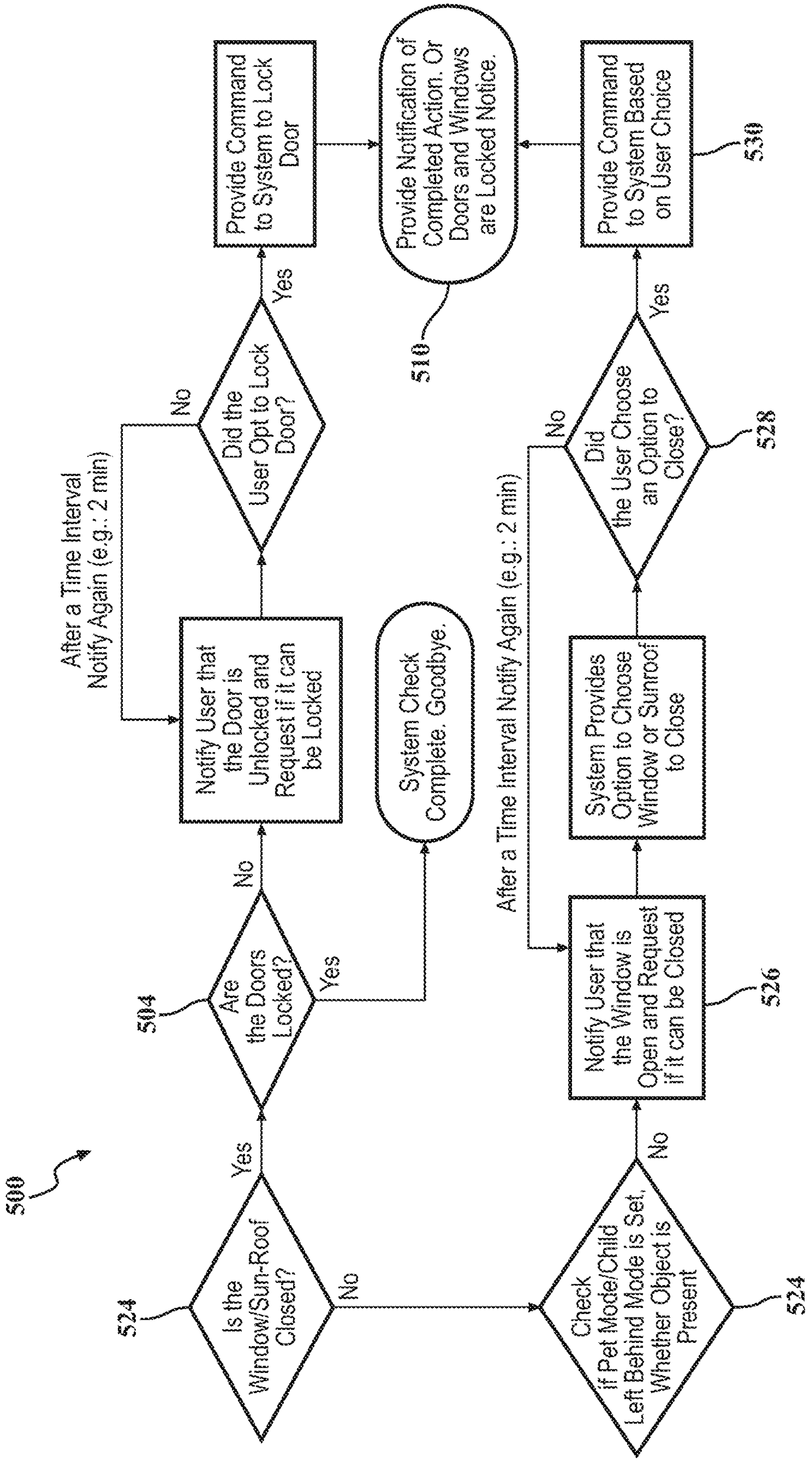

Referring to FIGS. 5A and 5C, based on determining that one or more windows 12 of the vehicle 10 is in the opened position at operation 502, the method 500 at operation 524 identifies the window 12 and/or sunroof 16 of the vehicle 10 that is in the opened position. In some examples, the method 500 includes at operation 526 determining whether a pet mode or child mode of the system 102 is activated. In other words, the system 102 may only notify the user that the window 12 or sunroof 16 is opened if the pet mode or child mode is activated. Otherwise, the system 102 may allow the user to leave the window 12 or sunroof 16 open without generating notifications to the user. In other examples, the method 500 at operation 526 determines whether an object, such as a pet or child or other object that would indicate the user is returning to the vehicle 10, is present at the vehicle 10.

Based on determination that the window 12 is in the opened position and that no object is present in the vehicle 10 (or that no object is present in the vehicle 10 that is indicative of the user returning to the vehicle 10), the method 500 at operation 526 includes generating the output signal 106 to the user to notify the user of the window 12 being opened and prompt the user to close the window 12. For example, and as shown in FIG. 3B, the signal 106 may cause the graphical user interface 302 of the application 300 to display the alert or selectable command 304 within the interface 302. The alert 304 may include a first selectable input 306*a* that commands the system 102 to move the window 12 to the closed position, and the alert 304 may include a second selectable input 306*b* that causes the alert 304 to disappear from the graphical user interface 302. Further, the alert 304 may allow the user to choose which closure device to close, such as via a first selectable option 308*a* that results in the window 12 moving to the closed position and a second selectable option 308*b* that results in the sunroof 16 closing. Thus, based on the user selecting the command 304 within the interface 302, the system 102 may control operation of the window 12 to move the window 12 to the closed position.

Thus, based on the user selecting the command 304 to adjust the window 12 to the closed position at operation 528 of the method 500, the method 500 at operation 530 operates the window 12 to adjust the window 12 from the opened position to the closed position. The method 500 may then return to operation 510 to notify the user that the window 12 is closed.

After the system 102 notifies the user that the window 12 of the vehicle 10 is opened and prompts the user to command the window 12 to the closed position, and based on the user not commanding the window 12 to the closed position at operation 528 for at least a threshold period of time, such as two minutes or less, the method 500 returns to operation 526 until the user commands the window 12 to close. In some examples, the system 102 may automatically command the window 12 to close after a second threshold period of time (e.g., after ten minutes or longer) or after transmitting a threshold number of notifications to the user (e.g., after three notifications or more).

Thus, upon determining that the closure device of the vehicle 10 is in the opened position and based on determining that no object or pet or child is present in the vehicle 10, the system 102 prompts the user to adjust the closure device from the opened position to the closed position. For example, the system 102 prompts the user via the notification 204 at the user device 200 associated with the user and/or the system 102 prompts the user via the notification 304 at the application 300 associated with the vehicle 10. The system 102 prompts the user before closing the closure device, such as to avoid situations where the user desires to leave the closure device open, such as during loading or unloading of the vehicle.

Figure 5D:
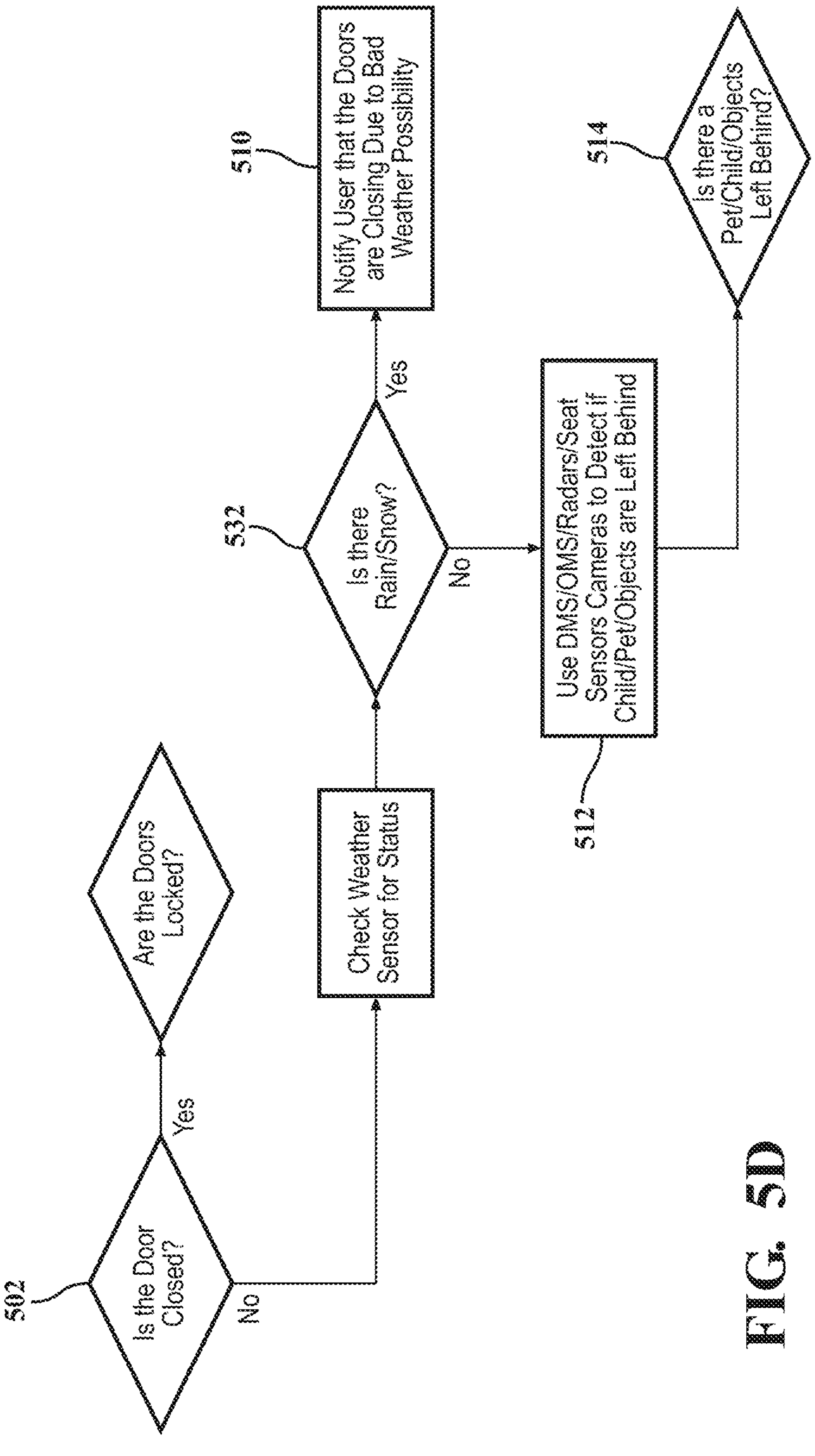

In some examples, the system 102 may adjust the closure device from the open position to the closed position without prompting the user. For example, and as shown in FIG. 5D, after determining at operation 502 that the door 14 is in the opened position, the system 102 may determine at step 532 an adverse condition, such as whether there is poor air quality, or whether there is rain or snow or other precipitation at the vehicle 10. That is, the system 102 determines precipitation at the vehicle 10 based on an external sensor input 108, such as from a rain or weather sensor 30 of the vehicle 10 or based on communications received at a vehicle to vehicle (V2V) or vehicle to everything (V2X) communication module 32 of the vehicle 10. Based on determining precipitation at the vehicle 10, the system 102 controls operation of door 14 to move the door 14 to the closed position and proceeds to operation 510 to notify the user that the door 14 is closing. If precipitation is not determined at the vehicle 10, the system 102 proceeds to operation 512 to determine presence of objects, pets, and children at the vehicle 10.

Figure 5E:
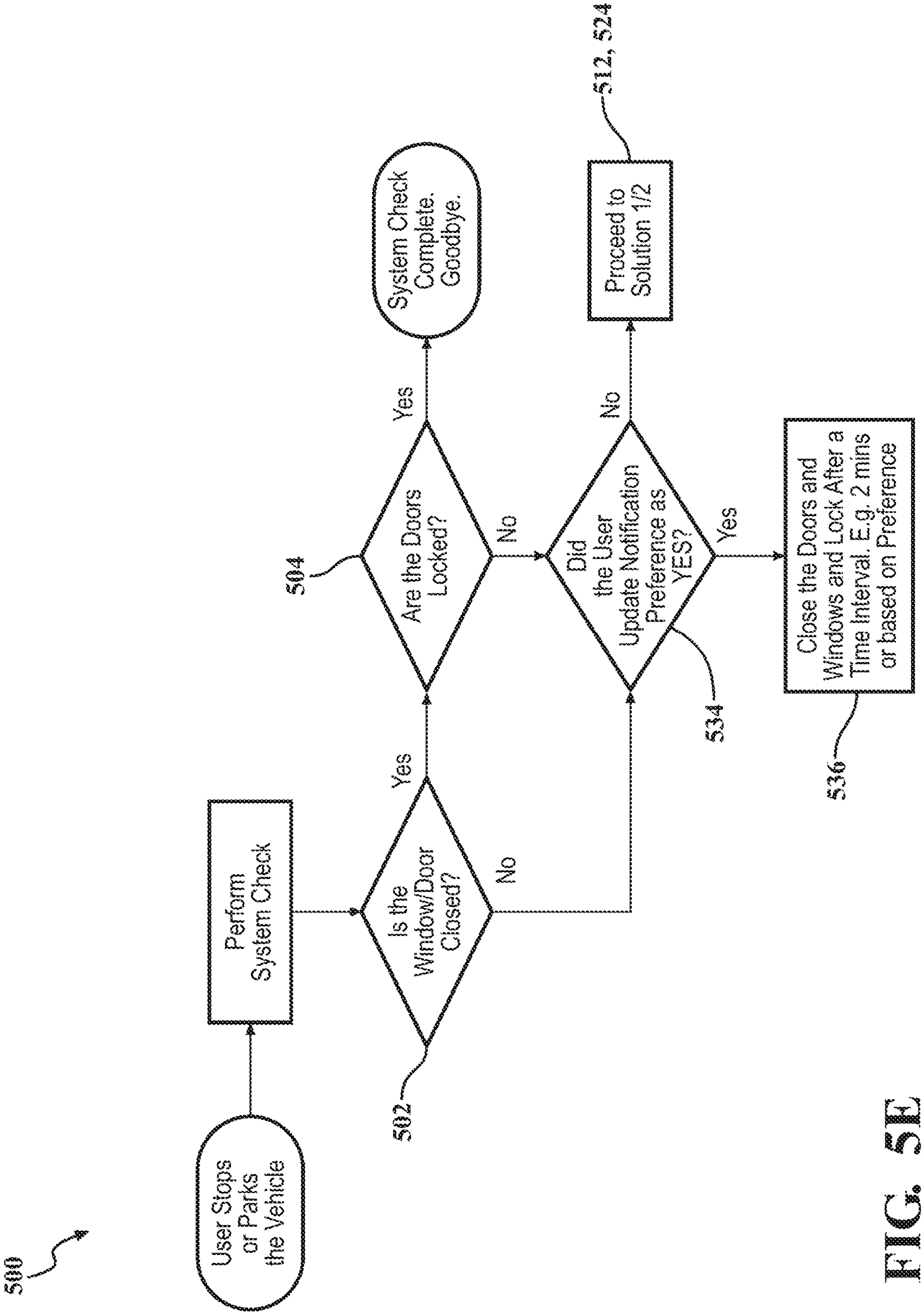

In reference to FIG. 5E, commanding the closure device to move from the open position to the closed position and/or adjusting the door 14 from an unlocked state to a locked state may be based on a preselected user preference 34 stored in memory at the vehicle 10. For example, based on determining at operation 502 that one or more closure devices (e.g., the window 12 and the door 14) of the vehicle 10 are in the opened position, or based on determining at operation 504 that the door 14 is in the unlocked state, the method 500 at operation 534 determines whether the user has provided the user preference 34. The user may provide the user preference input 34 via input at the mobile device 200, via input through the application 300, and/or via other input at the interior cabin of the vehicle 10 (e.g., through an infotainment system of the vehicle 10 and the like).

The user preference 34 may indicate, for example, a threshold period of time for the window 12 and/or door 14 to remain open before being moved to the closed and locked position. Further, the user preference 34 may indicate a threshold distance of the user (e.g., as determined based on detected distance from the vehicle 10 of a keyfob associated with the vehicle 10) where the system 102 moves the window 12 and/or door 14 to the closed position responsive to determination that the user is further than the threshold distance away from the vehicle 10. The user preference 34 may indicate different configurable settings for each closure device of the vehicle 10. Further, the user preference 34 may be based on other vehicle and environmental conditions, such as a weather condition determined based on the weather sensor 30 at the vehicle 10, a location 36 of the vehicle 10 (e.g., determined based on GPS coordinates), and the like.

Moreover, the user preference 34 may be determined by the system 102, such as based on historical commands from the user. For example, based on the user historically commanding the system 102 to close the window 12 and/or door 14 after an average period of time, the system 102 may determine the user preference 34 to move the closure devices to the closed positions after the average period of time has passed. That is, the system 102 may adjust the threshold period of time based on the average period of time that passes before the user typically commands the closure devices to the closed position.

Based on determining or receiving the user preference 34 at operation 534, the method 500 includes executing the user preference at operation 536. That is, the system 102 operates the closure device to move from the opened position to the closed position based on the user preference 34, such as after a threshold period of time or based on the user being greater than a threshold distance from the vehicle 10. When no user preference 34 is determined or received at operation 534, the method 500 may proceed to operation 512 to close the door 14 and/or operation 524 to close the window 12 of the vehicle 10.

Figure 5F:
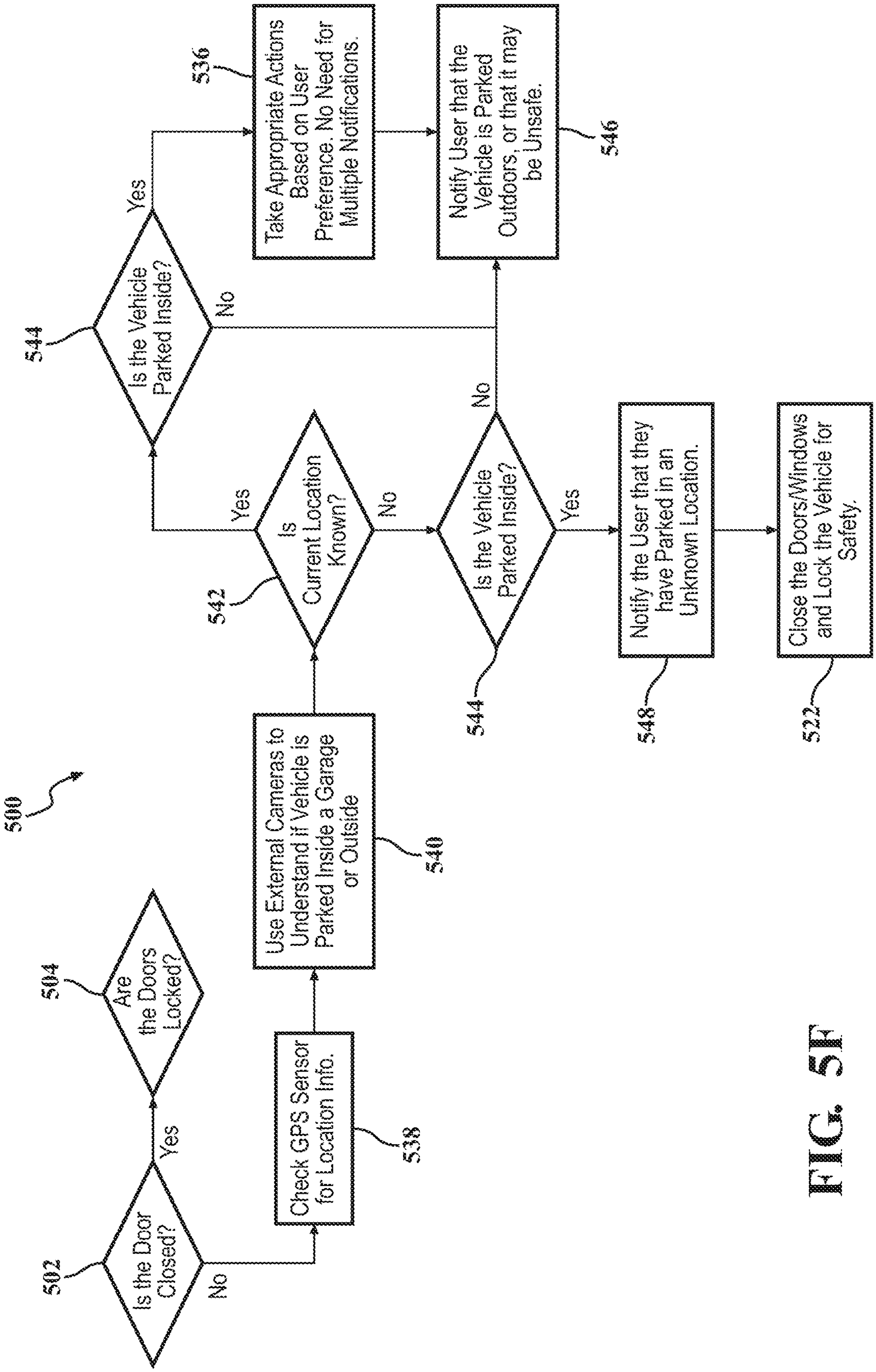

Referring to FIG. 5F, the closure operation system 102 may operate based on the known location 36 of the vehicle 10 and a determination of whether the vehicle 10 is located inside (e.g., within a residential garage or a commercial parking garage) or outside (e.g., a parking lot or driveway). In other words, prompting the user to adjust the closure device to the closed position may be further based on determination of the vehicle 10 in an outdoor and/or unknown location. Responsive to determining at operation 502 that the door 14 is in the opened position, the method 500 at operation 538 receives an input 104 from a GPS of the vehicle 10 for determining the vehicle location 36. At operation 540, the method 500 receives an input 108 from one or more external viewing cameras 38 of the vehicle 10 for determining whether the vehicle 10 is indoors or outdoors.

Accordingly, at operation 542, the method 500 includes determining whether the location 36 of the vehicle 10 is known or unknown. For example, the system 102 may store locations in memory, such as addresses or GPS coordinates associated with a home, school, business, or frequent location of the user. Optionally, the system 102 may determine that a current location 36 of the vehicle 10 is known based on a frequency or time spent for the vehicle 10 at the location. Further, a current location 36 of the vehicle 10 may only be assigned as a known location when the location is residential (e.g., a home or neighborhood) and the location may not be assigned as known location when the location is public (e.g., a commercial area). When the current location 36 of the vehicle 10 is a known location, the system 102 may prompt the user to command the closure device to the closed position, or the system 102 may allow the closure device to remain in the opened position (e.g., based on the user preference 34). When the current location 36 of the vehicle 10 is an unknown location, the system 102 may command the closure device to the closed position without prompting the user, such as because the unknown location is assumed to be unsafe.

At operation 544, the method 500 includes determining whether the vehicle 10 is parked inside or outside. For example, determination that the vehicle is inside or outside may be based on processing of image data captured by the exterior viewing camera 38 of the vehicle 10. Based on determination that the vehicle 10 is inside, the system 102 may prompt the user to command the closure device to the closed position, or the system 102 may allow the closure device to remain in the opened position (e.g., based on the user preference 34). When the vehicle 10 is determined to be outside, the system 102 may command the closure device to the closed position without prompting the user, such as because an outside location is more likely to result in intrusion of precipitation into the vehicle 10 or theft.

Thus, based on determination at operation 542 that the current location 36 of the vehicle 10 is known and based on determination at operation 544 that the vehicle 10 is inside, the method 500 proceeds to operation 536 and executes the user preference 34. That is, because the vehicle 10 is inside at a known location, the system 102 may forego notifying the user and instead command the closure device to the closed position based on the user preference 34. Based on determination at operation 542 that the current location 36 of the vehicle 10 is known and based on determination at operation 544 that the vehicle 10 is outside, the method 500 includes, at operation 546, generating a notification 204, 304 to the user. The notification 204, 304 is indicative of the vehicle 10 being outdoors, and the notification 204, 304 may prompt the user to command the closure device to the closed position. Based on determination at operation 542 that the current location 36 of the vehicle 10 is unknown and based on determination at operation 544 that the vehicle 10 is inside, the method 500 proceeds to operation 546 and generates a notification 204, 304 to the user. The notification 204, 304 is indicative of the vehicle 10 being in an unknown location, and the notification 204, 304 may prompt the user to command the closure device to the closed position. Based on determination at operation 542 that the current location 36 of the vehicle 10 is unknown and based on determination at operation 544 that the vehicle 10 is outside, the method 500 includes, at operation 548, generating a notification 204, 304 to the user indicative of the vehicle 10 being in an unknown location that is outside, and the method 500 may automatically proceed to operation 522 to move the door 14 to the closed position.

In some examples, after the user has commanded the closure device to the closed position, and based on determination that the closure device has failed to move to the closed position (e.g., due to an obstruction preventing the closure device from closing), the system 102 may generate a notification 204, 304 to the user indicative of the closure device failing to move to the closed position. Thus, the user may attempt another command to move the closure device to the closed position, or the user may return to the vehicle 10 to manually close the closure device.

Figure 6:
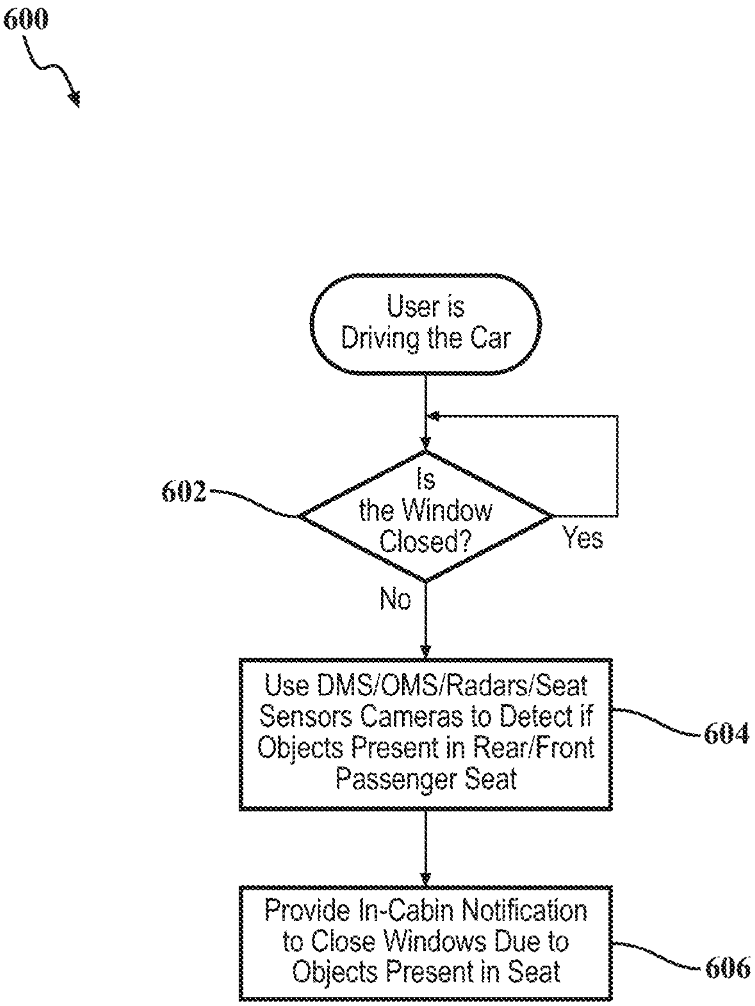
FIG. 6 is a flow diagram depicting an example method of operating the closure operating system with the vehicle travelling along a road.

FIG. 6 provides a flowchart of an exemplary arrangement of operations for a method 600 of operating the window 12 between the opened and closed positions with the vehicle 10 driving along a road and based on determined presence of objects at the vehicle 10, based on poor air quality or a weather condition ahead of the vehicle 10, and the like. At operation 602, the method 600 includes determining whether the window 12 is in the opened position. Based on determination that the window 12 is in the opened position, the method 600 includes at operation 604 determining if objects are present at or near the opened window 12. For example, the system 102 may determine presence of objects based on processing of image data captured by the in-cabin camera 22, based on the seat sensors 24, based on radar data from the onboard security system 26, and the like. Based on determination that the window 12 is opened and based on detection of an object at or near the opened window 12, the method 600 at operation 606 includes generating an in-cabin notification 402 to the user indicative of the opened window 12 and presence of the object.

Figure 4:
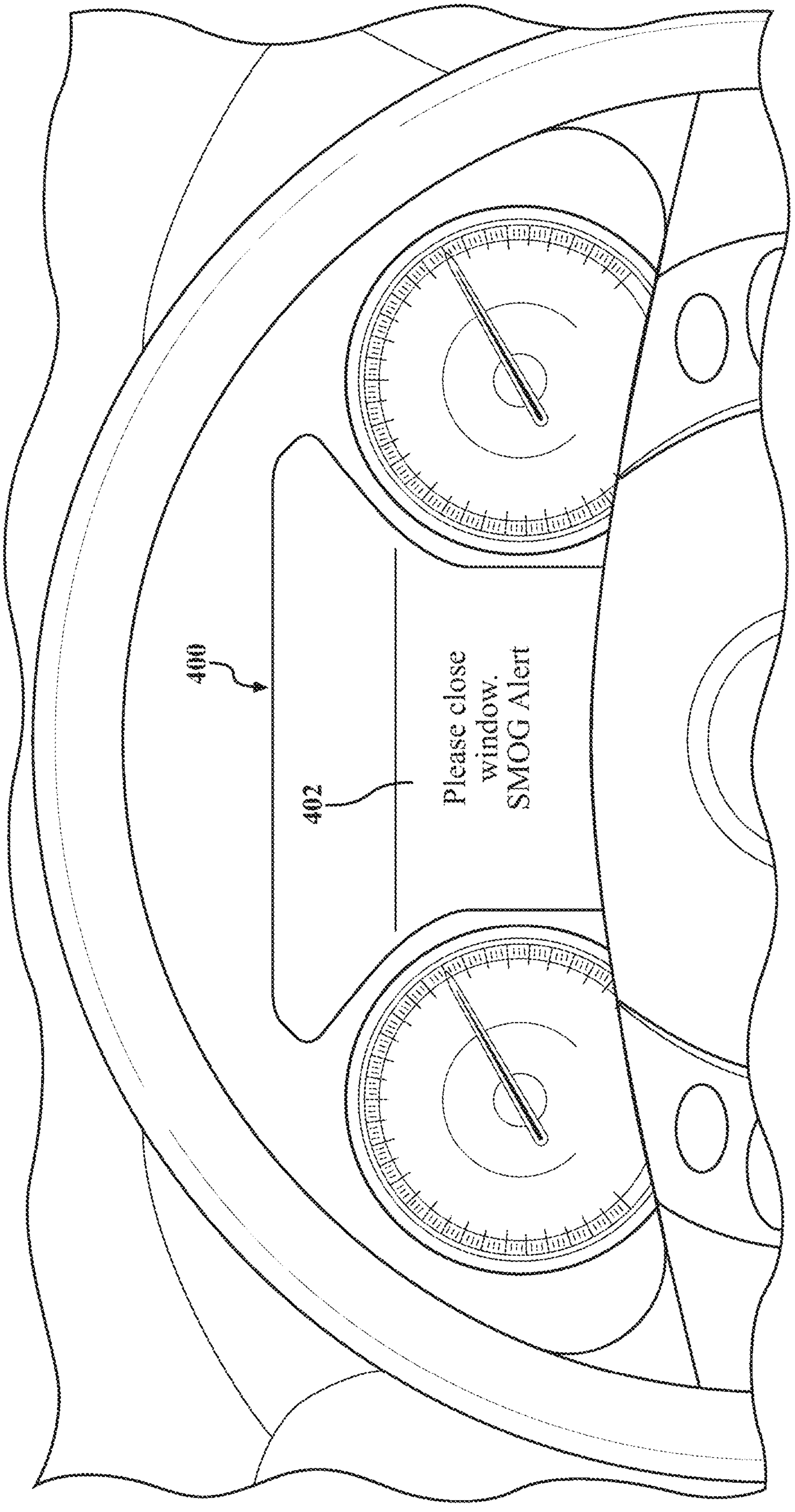
FIG. 4 is an enlarged view of a gauge cluster display screen of the vehicle displaying an alert to a user based on a signal received from the closure operating system.

For example, and as shown in FIG. 4, the in-cabin notification 402 may be displayed to the user at a heads up display (HUD) or gauge cluster display 400 of the vehicle 10. In other examples, the in-cabin notification 402 may be provided via one or more other displays within the vehicle, such as at an infotainment display screen, or via an audible tone. The in-cabin notification 402 may prompt the user to adjust the window 12 to the closed position and the system 102 may automatically adjust the window 12 to the closed position based on input from the user or after a threshold period of time after generating the notification 402. Thus, while the vehicle 10 is travelling along a road, and based on determination that the window 12 is in the opened position, and based on determination that the object is present, the system 102 prompts the user to select the command to adjust the window 12 from the opened position to the closed position.

Further, while the vehicle 10 is travelling along the road, the system 102 may prompt the user to command the window 12 to the closed position based on inputs 108 from V2V or V2X communications 32. For example, the V2V or V2X communications may be indicative of an adverse condition, like a weather condition, air quality condition, and the like. Thus, based on receiving the signal from another vehicle indicative of the adverse condition, the system 102 prompts the user to select the command to adjust the window 12 from the opened position to the closed position. This allows the user to close the windows 12 before the vehicle 10 encounters poor air quality, adverse weather, loud noises, and the like. Moreover, the system 102 may participate in the V2V or V2X communications to alert other vehicles to adverse conditions, such as based on inputs 104 received from an in-cabin air quality sensor 40 of the vehicle 10.

Additionally, the system 102 may prompt the user to adjust the windows 12 from the opened position to the closed position based on traffic conditions at the vehicle 10, such as to prevent the driver and passengers from experiencing poor air quality due to emissions from other vehicles. For example, the system 102 may receive inputs 108 from lidar sensors 42 and/or radar sensors 44 of the vehicle 10 that indicate close proximity of other vehicles, which may be indicative of slow and/or congested traffic surrounding the vehicle 10.

Thus, the system 102 automatically detects if a window 12 or door 14 of the vehicle 10 is left open and automatically detects if the user is away from the vehicle 10 and the system 102 closes the window 12 or door 14 only when it is recognized that the user is done with a task and thus unlikely to return to the vehicle 10, such as based on whether objects are present in the vehicle 10 with the window 12 or door 14 open. That is, the system 102 may use interior viewing cameras 22 to detect objects within the vehicle 10 for determining whether to close the window 12 or door 14 of the vehicle 10. Further, the system 102 may transmit location-based notifications 204, 304 to the user when the closure devices are in the opened position and the vehicle 10 is in known locations, unknown locations, inside locations, and/or outside locations. When the vehicle 10 is travelling along the road, the system 102 may provide rear seat reminders when the window 12 is opened and the system 102 determines presence of objects at or near the windows 12, such as to prevent theft or to prevent objects from being pulled out through the windows 12. Moreover, the system 102 may recommend closing the windows 12 based on poor air quality or weather conditions determined via V2V or V2X communications 32.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:

determining that a closure device is in an opened position;

determining, via processing of sensor data, that a user is not present;

determining, via processing of sensor data, whether an object is present;

based on determination that the closure device is in the opened position, and based on determination that the user is not present, and based on determination that the object is not present, prompting the user to select a command to adjust the closure device from the opened position to a closed position;

based on the user selecting the command, operating the closure device to adjust the closure device from the opened position to the closed position; and based on determination that operating the closure device has failed to adjust the closure device from the opened position to the closed position, generating an alert to the user, the alert indicative of the closure device failing to adjust from the opened position to the closed position.

2. The method of claim 1, wherein the operations further comprise, based on determination that the closure device is in the opened position, and based on determination that the user is not present, and based on determination that the object is present, generating a second alert to the user, the second alert indicative of the closure device being in the opened position and presence of the object.

3. The method of claim 1, wherein the user selecting the command comprises selection of a user preference setting.

4. The method of claim 1, wherein the operations further comprise, based on determination that the closure device is in the opened position, and based on determination of an adverse condition, operating the closure device to adjust the closure device from the opened position to the closed position and generating a notification to the user, the notification indicative of adjusting the closure device from the opened position to the closed position.

5. The method of claim 1, wherein prompting the user to select the command is further based on determination, via processing of sensor data, of an outdoor location.

6. The method of claim 1, wherein prompting the user to select the command is further based on determination of a known location.

7. The method of claim 1, wherein:

the closure device is disposed at a vehicle; and the operations further comprise, while the vehicle is travelling along a road, and based on determination that the closure device is in the opened position, and based on receiving a signal from another vehicle indicative of an adverse condition, prompting the user to select the command to adjust the closure device from the opened position to the closed position.

8. The method of claim 1, wherein:

the closure device is disposed at a vehicle; and the operations further comprise, while the vehicle is travelling along a road, and based on determination that the closure device is in the opened position, and based on determination that the object is present, prompting the user to select the command to adjust the closure device from the opened position to the closed position.

9. The method of claim 1, wherein the closure device comprises at least one selected from the group consisting of (i) a vehicular door, (ii) a vehicular liftgate, (iii) a vehicular window, and (iv) a vehicular sunroof.

10. A system comprising:

memory hardware storing instructions that, when executed on data processing hardware in communication with the memory hardware, cause the data processing hardware to perform operations comprising:

determining that a closure device of a vehicle is in an opened position;

determining, via processing of sensor data, that a user is not present at the vehicle;

determining, via processing of sensor data, whether an object is present within the vehicle;

based on determination that the closure device is in the opened position, and based on determination that the user is not present, and based on determination that the object is not present, prompting the user to select a command to adjust the closure device from the opened position to a closed position;

based on the user selecting the command, operating the closure device to adjust the closure device from the opened position to the closed position; and based on determination that operating the closure device has failed to adjust the closure device from the opened position to the closed position, generating an alert to the user, the alert indicative of the closure device failing to adjust from the opened position to the closed position.

11. The system of claim 10, wherein the operations further comprise, based on determination that the closure device is in the opened position, and based on determination that the user is not present, and based on determination that the object is present, generating a second alert to the user, the second alert indicative of the closure device being in the opened position and presence of the object.

12. The system of claim 10, wherein the user selecting the command comprises selection of a user preference setting.

13. The system of claim 10, wherein prompting the user to select the command is further based on determination, via processing of sensor data, of at least one selected from the group consisting of (i) an outdoor location and (ii) a known location.

14. The system of claim 10, wherein the closure device comprises at least one selected from the group consisting of (i) a door of the vehicle, (ii) a liftgate of the vehicle, (iii) a window of the vehicle, and (iv) a sunroof of the vehicle.

15. A vehicle comprising:

memory hardware storing instructions that, when executed on data processing hardware in communication with the memory hardware, cause the data processing hardware to perform operations comprising:

determining that a closure device of the vehicle is in an opened position;

determining, via processing of sensor data, that a user is not present at the vehicle;

determining, via processing of sensor data, whether an object is present within the vehicle;

based on determination that the closure device is in the opened position, and based on determination that the user is not present, and based on determination that the object is not present, prompting the user to select a command to adjust the closure device from the opened position to a closed position;

based on the user selecting the command, operating the closure device to adjust the closure device from the opened position to the closed position;

based on determination that operating the closure device has failed to adjust the closure device from the opened position to the closed position, generating an alert to the user, the alert indicative of the closure device failing to adjust from the opened position to the closed position; and while the vehicle is travelling along a road, and based on determination that the closure device is in the opened position, and based on receiving a signal from another vehicle indicative of an adverse condition, prompting the user to select the command to adjust the closure device from the opened position to the closed position.

16. The vehicle of claim 15, wherein prompting the user to select the command is further based on determination, via processing of sensor data, of at least one selected from the group consisting of (i) an outdoor location and (ii) a known location.

17. The vehicle of claim 15, wherein the user selecting the command comprises selection of a user preference setting.

18. The vehicle of claim 15, wherein the operations further comprise, while the vehicle is travelling along the road, and based on determination that the closure device is in the opened position, and based on determination that the object is present, prompting the user to select the command to adjust the closure device from the opened position to the closed position.

19. The vehicle of claim 15, wherein the closure device comprises at least one selected from the group consisting of (i) a door of the vehicle, (ii) a liftgate of the vehicle, (iii) a window of the vehicle, and (iv) a sunroof of the vehicle.

* * * * *